UNITED STATES PATENT OFFICE.

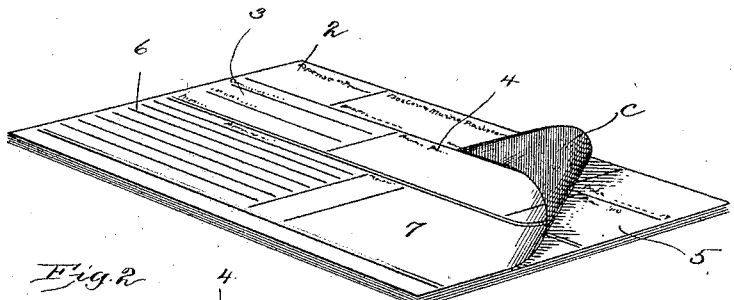

ANDREW L. FELCH, OF SOMERVILLE, MASSACHUSETTS.

FORM FOR ACCOUNTS.

SPECIFICATION forming part of Letters Patent No. 688,840, dated December 17, 1901.

Application filed January 19, 1901. Serial No. 43,902. (No model.)

*To all whom it may concern:*

Be it known that I, ANDREW L. FELCH, a citizen of the United States, and a resident of Somerville, in the county of Suffolk and State of Massachusetts, have invented an Improvement in Forms for Accounts, of which the following description, in connection with the accompanying drawings, is a specification, like characters on the drawings representing like parts.

This invention relates to a novel form for accounts; and it has for its object to provide such a form as may be used in the shipping of freight or other matter.
With the present system of shipping freight the shipper or consignor makes out a shipping-receipt in duplicate or triplicate, which is delivered with the shipment at the freight-house. The receiving-clerk or freight agent stamps or fixes his signature to the same after checking the shipment, and such receipt is preserved for the shipper, while one of the duplicate forms is used as the office record. From this the data regarding the shipment are copied upon a way-bill, which is given to the conductor or otherwise forwarded to the receiving end, where the data regarding the shipment are again copied from the way-bill upon the freight-bill. It is found in practice that it frequently happens that mistakes occur in this repeated copying of the data regarding the different shipments; and it is the object of my invention to provide such a system of shipping in which a form is used of such a character that the filling in of the proper data regarding the shipment by the shipper or the receiving freight agent completes the entire record needed by the railroad or carrying agent. The form that I preferably use comprises a plurality of superimposed sheets or leaves having manifolding means therebetween, and each leaf will preferably have in the same relative position thereon an indicating imprinted space to be used exclusively for either the word "Prepaid" or the word "Expense," a space for the freight-house record and the receiving freight agent's signature, and in the same space the receiving-clerk's number may be placed, and another space which contains a business-card of the consignor, and in addition to the above-named three spaces the form will contain the usual spaces for registering the articles shipped and their weights and a space imprinted to designate the consignee's name and destination of the goods. All of the leaves except the first or top leaf will have, in addition to the above-described spaces, the usual space divided into prepaid and expense columns for the freight charges and a space for the car-number. The form will have as many leaves as necessary to complete the entire records of the railroad or the carrying agent and in the form shown. For instance, the first sheet will be used for the shipping-receipt to be retained by the consignor, and the other sheets of the pad will be used, respectively, for the shipping-order, the conductor's way-bill, the delivery-check, and the freight-bill, though it will be understood that more sheets than those enumerated above may be used, if desired, in completing the records of the railroad or carrying agent. With the leaves of the form superimposed and provided with manifolding means therebetween either the shipper or the receiving freight agent will fill out the blanks on the first leaf, which consists in writing in the proper indicating imprinted spaces the consignee's name and the destination of the goods, the list of articles sent and their weight, with "Prepaid" or "Expense," the date of the shipment, &c., and the consignor's name and advertisement, if this is not imprinted on all the leaves. The freight agent will then fill in the remaining indicating imprinted spaces by giving the freight-house record and the receiving-clerk's number and will affix his signature at the proper place. The first or top leaf will be removed from the form and preserved by the shipper or consignor as his receipt, and the receiving freight agent will then fill in the remaining blanks upon sheet 2 which consists in specifying the freight charges and giving the car-number. It will be understood, of course, that in filling in the blanks on the first and second sheets, as above specified, by reason of the manifolding means between the sheets an impression will be made upon each succeeding sheet, so that a single writing upon the first sheet makes an accurate impression thereof upon all the sheets necessary for the complete record of the shipment. The second sheet is preserved at the receiving freight-station for their records, and the third sheet is used by the conductor as his way-bill. The remaining sheets are forwarded to the receiving end of the line, where one of the remaining sheets is used as a delivery-check and the other as a freight-bill to thus complete the railroad records. With my system and novel form for accounts therefor it is unnecessary that any copying from one form to another should be done, as the first writing upon the first sheet of the form fills in the blanks in all the succeeding sheets of the form.

Referring to the drawings, Figure 1 shows in perspective a form which is adapted to be used as above described; and Figs. 2, 3, 4, 5, and 6 represent, respectively, different leaves or sheets of the form.

Preferably the form will be made as a pad, and the various sheets or leaves thereof may be superimposed one upon the other and secured together at one end in any suitable way. Suitable manifolding means are used between adjacent sheets or leaves, and for the sake of convenience I prefer to carbonize the back side of each leaf, as seen at $c$, thus doing away with the necessity of extra carbon-sheets, though my invention is not limited to a plurality of superimposed sheets, each being carbonized on the back, as any usual manifolding means may be employed. Each leaf has a plurality of imprinted spaces thereon, in which spaces the various data regarding the shipment are to be placed, and these spaces are preferably made by dividing the face of each leaf into squares or spaces by horizontal and vertical lines, though this particular method of dividing each leaf into spaces is not absolutely essential to my invention. In the preferred embodiment of my invention, however, each leaf will be divided into three divisions by parallel horizontal lines $a\ b\ c'$, and each division is subdivided by vertical lines into spaces or squares which are properly imprinted to designate the different data regarding the shipment, the similarly-imprinted squares on each leaf being in the same relative position.

Referring to Fig. 2, which represents the first sheet of the form, it will be seen that at 3 is the usual space imprinted to designate the consignee's name and the destination of the goods shipped, and at 6 is the usual space imprinted to designate the list of the articles included in the shipment, together with their weights. In addition to these usual spaces, which occur on all ordinary forms now used in shipping freight, I provide three additional or special spaces, said additional spaces including a space designated by 2, which is imprinted to designate either the word "Prepaid" or the word "Expense," according to the circumstances of the shipment, and a space 4, which will be occupied by a business-card of the consignor or shipper, said business-card to include the name of the shipper, his address, and business, and a further space 5, which will be preferably imprinted to designate the freight-house record, and in which space will also be placed the freight agent's signature, the date of the shipment, and preferably the receiving-clerk's number. The freight-house record may be either kept by means of the "progressive number" of the shipment or in any other suitable way.

Referring to Fig. 3, which shows the second sheet of the pad, it will be seen that this contains duplicates of the spaces 2, 3, 4, 5, and 6 on sheet 1, said spaces being arranged in the same relative positions as the corresponding spaces on the first sheet, the said spaces to be used for the same purpose as in Fig. 2. In addition to these spaces, however, sheet 2 will have the usual ruled spaces imprinted to designate the freight charges, together with the usual expense and prepaid columns in which the freight charges will be placed, said space being designated by 7, and a space at the upper right-hand corner designated by $5'$, which will be imprinted to designate the car-number and the date of the shipment. All of the spaces above described may be properly imprinted to designate the facts or data which are to be filled in, if desired.

Sheet 2 (represented in Fig. 3) is to be used as the shipping-order and will be preserved in the receiving freight-station to complete their records, while the first sheet (represented in Fig. 2) will be returned, when properly signed and filled in, to the consignor as his receipt. Sheet 3 (represented in Fig. 4) is to be used as the conductor's way-bill, and this is in all particulars identical with sheet 2. (Shown in Fig. 3.) Sheet 4 (illustrated in Fig. 5) is to be used as the delivery-check at the receiving end, and this will be in all respects similar to sheets 2 and 3; but in addition thereto at the bottom thereof or in some other suitable position will be a space imprinted to designate the signature of the consignee when the goods are delivered to him and the date of the delivery and other blanks imprinted to designate who it was delivered by, &c., if desired. The last sheet of the form (represented in Fig. 6) is used as a freight-bill and is identical with sheets 2, 3, and 4, except that it has at some suitable place, preferably at the bottom, a space for the signature of the freight cashier.

From the above description it will be obvious that all of the leaves of my form include, in addition to the ordinary spaces which usually appear upon forms now in use in shipping freight, three special spaces or squares, which, so far as I am aware, are new with me—i. e., the special square 2 to designate the word "Prepaid" or "Expense," the special square 4, imprinted to designate the person from whom the goods were received and which space will also contain the business-card of the shipper, and the space designated 5, which will be imprinted to designate the freight-house record for the purpose of future identification, either by specifying the progressive number of the shipment or any other suitable data which may be desired. The last square 5 will also have a place for the freight agent's signature. It is also contemplated that this square will include the receiving-clerk's number, which forms part of the freight-house record.

In using the form the blanks in the first sheet will be filled in either by the consignor or the receiving freight agent, and the receiving freight agent will affix his signature thereto and give the freight-house record, &c., and in addition will fill in the freight charges on blank 7 in sheet 2 and will write the car-number in blank 5'. Since the back side of each sheet is carbonized, the filling in of these blanks on sheets 1 and 2 will complete the record upon all the remaining sheets of the form, and the first sheet will then be torn off and retained by the consignor as a receipt, while the second sheet will be retained in the receiving freight-office to complete the records there, and the way-bill will be delivered to the conductor and the last two sheets will be forwarded to the receiving freight-station. When the goods arrive and are delivered, the blanks at the bottom of the delivery-check are filled in by properly-authorized persons and the freight-bill receipted, and these papers are filed away in their proper places.

It will thus be seen that by my system of shipping freight I do away with the necessity of copying from one form onto another in order to complete the records of the railroad or carrying agent, and if any mistake occurs it can be readily traced to the person who filled in the blank originally. In the present system of shipping freight it is found that this repeated copying of data regarding the shipments leads to frequent errors.

While I have illustrated my invention as comprising only a shipping-receipt, a shipping-order, a way-bill, a delivery-check, and a freight-bill, yet it will be obvious that if more leaves are desired to complete the record of the railroad or carrying agent such further leaves may be added to the form without departing from the spirit and scope of my invention, the form illustrated being merely a sample form. It will also be obvious that the invention is not limited in its use to the shipping of freight, but may be used by any common carrier for the keeping of records regarding shipments.

I contemplate in carrying out my system the carrying agent will furnish different shippers with a variety of forms constructed as above described, so that the proper blanks may be filled in by the shipper, and inasmuch as each leaf contains the advertisement of the shipper I have provided, in addition to a complete system of account, a novel form of advertising.

Various changes may be made in the arrangement of the form without departing from the spirit of my invention as expressed in the appended claims.

Having described my invention, what I claim as new, and desire to secure by Letters Patent, is—

1. A form for use in shipping freight, comprising a series of superimposed leaves having manifolding means therebetween, each leaf having thereon the usual spaces imprinted to designate the list of articles shipped and their weights, and the usual prepaid and expense columns for the freight charges, and in addition thereto and separate from said prepaid and expense columns a space imprinted to designate the word "Prepaid" or "Expense," and a single appropriately-designated space for the freight-house record, said space including a space for the agent's signature, similar spaces on each leaf being in the same relative position whereby the filling in of the blank spaces on the first sheet of the form makes an impression on all the succeeding leaves of the form.

2. A form for use in shipping freight comprising a series of superimposed leaves, all of the leaves except the last being carbonized on the back side, and each leaf having usual spaces imprinted to designate the consignee's name and destination of the goods shipped, and the list of the articles shipped and their weights, and the usual prepaid and expense columns for the freight charges, and in addition thereto a space imprinted to designate the word "Prepaid" or the word "Expense," an imprinted space to designate the freight-house record and to receive the freight-agent's signature, and a space containing the business-card of the shipper or consignor, the similar spaces being in the same relative position on each leaf whereby when the blanks on the first sheet are properly filled in, a complete record is made on all the succeeding leaves of the form.

3. A form for accounts comprising a plurality of superimposed leaves having manifolding means therebetween, each leaf having a plurality of spaces thereon, said spaces including the usual spaces imprinted to designate the consignee's name and the destination of the goods, and the list of articles shipped and their weight, and in addition thereto a space imprinted to designate the word "Prepaid" or "Expense," a space for the business-card of the consignor, a single space to designate the freight-house record and for the freight agent's signature, the similar spaces on each leaf being in the same relative position, and all the leaves except the first having in addition and in the same relative position the usual imprinted space including the prepaid and expense columns for the freight charges.

4. A form for accounts comprising a series of five or more superimposed leaves having manifolding means therebetween, each leaf having thereon a plurality of spaces, said spaces including the usual spaces imprinted to designate the list of articles shipped and the consignee's name and destination of the goods, and in addition thereto a space imprinted to designate the word "Prepaid" or "Expense," a space occupied by a business-card of the consignor, a single space for the freight-agent's signature and the freight-house record, the similar spaces on the leaves being in the same relative position and all the leaves except the first having in addition to the spaces above named, and in the same relative position on the leaf, the usual imprinted space including the prepaid and the expense columns for the freight charges, and a separate imprinted space to designate the car-number, said leaves when the blanks are filled serving respectively as a shipping-order, a way-bill, a delivery-check, and a freight-bill.

5. A shipping-blank comprising a plurality of superimposed leaves having manifolding means therebetween, each leaf having squares or spaces thereon which are inclosed by lines, said squares including a square for the usual prepaid and expense columns for the freight charges and other squares imprinted to designate the consignee's name and address, the list of articles shipped, the word "Prepaid" or "Expense," and the consignor's name respectively, and a square for the freight-agent's signature, the similar squares being in the same relative position on each sheet.

In testimony whereof I have signed my name to this specification in the presence of two subscribing witnesses.

ANDREW L. FELCH.

Witnesses:
GEO. W. GREGORY,
LOUIS C. SMITH.